F. WRIGHT.
BATTERY CONNECTOR.
APPLICATION FILED JAN. 9, 1914. RENEWED FEB. 4, 1916.
1,197,246.
Patented Sept. 5, 1916.
Fig. 1,
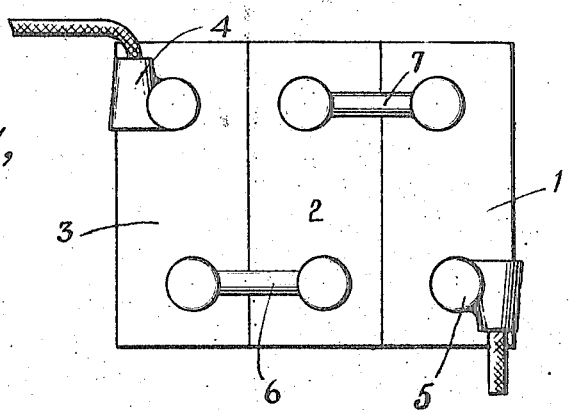
Fig. 2,
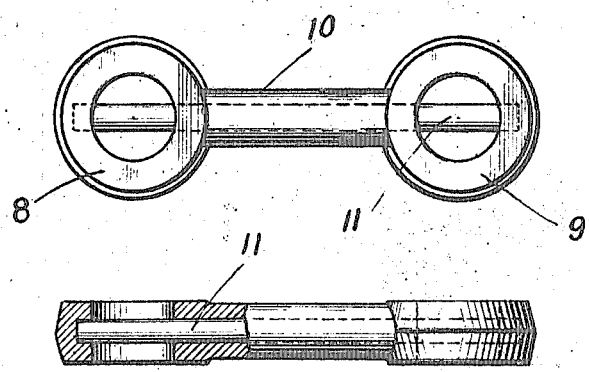
Fig. 3,
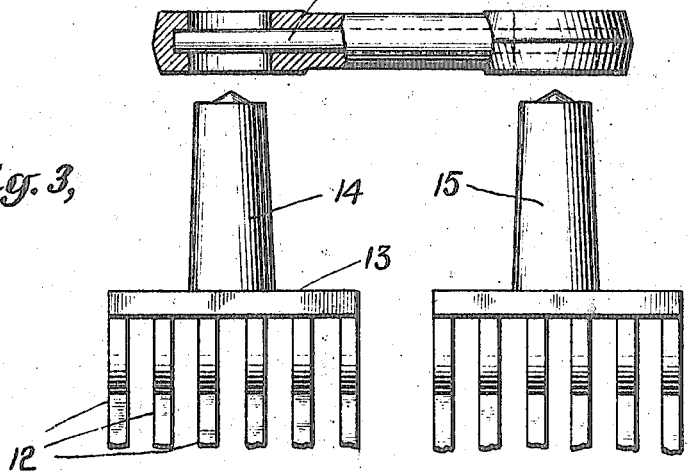
Fig. 4,
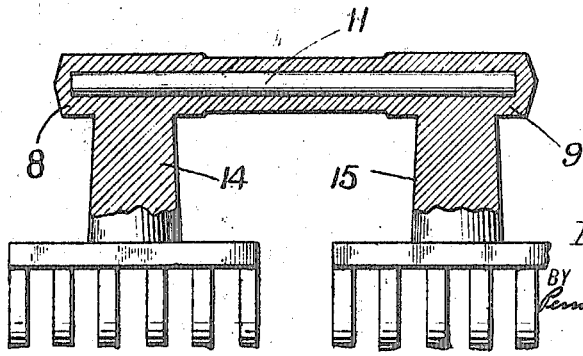
WITNESSES
C. B. Schroeder
L. Bates
INVENTOR
Frederick Wright
BY
Pennie Davis & Goldsborough
ATTORNEYS

UNITED STATES PATENT OFFICE.

FREDERICK WRIGHT, OF POUGHKEEPSIE, NEW YORK, ASSIGNOR, BY MESNE ASSIGNMENTS, TO WRIGHT STORAGE BATTERY COMPANY, OF POUGHKEEPSIE, NEW YORK, A CORPORATION OF NEW YORK.

BATTERY-CONNECTOR.

1,197,246.   Specification of Letters Patent.   Patented Sept. 5, 1916.

Application filed January 9, 1914, Serial No. 811,151. Renewed February 4, 1916. Serial No. 76,231.

*To all whom it may concern:*

Be it known that I, FREDERICK WRIGHT, a citizen of the United States, residing at Poughkeepsie, Dutchess county, State of New York, have invented certain new and useful Improvements in Battery-Connectors; and I do hereby declare the following to be a full, clear, and exact description of the invention, such as will enable others skilled in the art to which it appertains to make and use the same.

It is the object of the present invention to provide an improved cross-connection for use in the storage battery art, and more particularly to provide a connection of high conductivity whereby adjacent poles of storage battery cells may be electrically connected together.

In storage battery work it is not ordinarily feasible to use exposed conductors of copper or brass near the batteries themselves, because of the corroding action of the sulfuric acid used in the batteries and of the vapors given off by the batteries during charging. It is desirable that all connecting parts be of lead or lead covered.

The connector of the present invention satisfies the above requirements and has the further advantage of high conductivity, and is particularly well suited for use on a factory scale, for it is in many respects "fool" proof and reliable even under factory conditions.

The details of the invention and other advantages and characteristic features will be made clear by the following detailed description, which is to be taken in conjunction with the accompanying drawings, wherein—

Figure 1 is a diagram showing the top of a storage battery comprising three cells connected in series; Fig. 2 is a plan view of a connector constructed in accordance with the present invention; Fig. 3 is an assembly showing the studs of two adjacent sets of battery plates and the connector in position for union with those studs by burning, and Fig. 4 is a cross-sectional elevation of the completed connection between the two sets of plates.

The battery of Fig. 1 comprises three cells, 1, 2 and 3, and is of a type well suited for use on automobiles as a part of the electrical starting system or of the ignition system, and is provided with positive and negative terminals 4 and 5 and cross-connections 6 and 7 whereby all three cells are placed in series in accordance with common practice. These cross-connections are constructed in accordance with the present invention and as shown in Fig. 2 comprise a pair of lead rings 8 and 9 connected by a lead shank 10 and carrying a copper rod 11, which passes through the entire length of shank 10 and across the opening of each ring, and has its ends embedded in the farther wall of each of the rings 8 and 9.

Fig. 3 shows fragments of a group of battery plates 12 welded to a head 13 from which rises a stud 14, and a similar set of plates in an adjacent cell is provided with a stud 15, and it is the function of the cross-connection to establish a permanent electrical path of good conductivity between these two studs. This result is attained by dropping the cross-connection down at the top of studs 14 and 15 until the copper rod 11 strikes against those tops. Then torches are applied through the openings in rings 8 and 9, and the tops of studs 14 and 15 are melted or softened, and the rod 11 sinks down through them until the entire openings within rings 8 and 9 are filled with metal. Then the structure is allowed to cool and, if desired, may be smoothed off at the top to give a finished appearance.

The joint as complete is illustrated in Fig. 4, and it will be seen that the studs 14 and 15 have been merged by fusion into the rings 8 and 9, and the copper 11 furnishes a highly conductive path for current from one stud to the other. With this form of connection a careless workman cannot make an incomplete weld, because it is not possible to force the cross-connection down to final position on studs 14 and 15 until their tops have been rendered sufficiently molten to open and receive the rod 11, and when they have been heated sufficiently for this purpose, a good union with the lead and copper of the connection is insured.

When the joint is complete, the entire cross-section of each of the studs 14 and 15 is available for carrying current, for the rod 11 extends entirely across the top of each stud and lies directly in the path of current flowing from one stud to the other. In the completed joint the copper rod is completely enveloped in lead and protected from corrosion.

I claim:

1. A battery connector comprising a pair of lead rings connected by a lead shank, and a metal bar of good conductivity passing through said shank and across the openings in said rings.

2. A battery connector comprising a pair of lead rings connected by a lead shank, and a copper rod passing through said shank and into the openings of said rings.

3. A battery connector comprising a lead shank provided at either end with a lead ring wherein a battery stud is received and welded, and a copper bar extending through said shank and across said rings through the metal of the studs welded therein.

In testimony whereof I affix my signature, in presence of two witnesses.

FREDERICK WRIGHT.

Witnesses:
 ALFRED BOLOGNESI,
 S. BLIDE.